(12) United States Patent
Jin et al.

(10) Patent No.: US 11,155,905 B2
(45) Date of Patent: Oct. 26, 2021

(54) ENHANCED WEAR RESISTANT STEEL AND METHODS OF MAKING THE SAME

(71) Applicants: EXXONMOBIL RESEARCH AND ENGINEERING COMPANY, Annandale, NJ (US); POSCO, Pohang-Si (KR)

(72) Inventors: Hyunwoo Jin, Easton, PA (US); Ning Ma, Whitehouse Station, NJ (US); Raghavan Ayer, Basking Ridge, NJ (US); Russell Robert Mueller, Washington, NJ (US); Hak-Cheol Lee, Pohang-Si (KR); Jong-Kyo Choi, Pohang-Si (KR); In-Shik Suh, Pohang-Si (KR)

(73) Assignees: ExxonMobil Research and Engineering Company, Annandale, NJ (US); POSCO, Pohang-Si (KR)

(*) Notice: Subject to any disclaimer, the term of this patent is extended or adjusted under 35 U.S.C. 154(b) by 417 days.

(21) Appl. No.: 15/977,796

(22) Filed: May 11, 2018

(65) Prior Publication Data
US 2018/0258515 A1 Sep. 13, 2018

Related U.S. Application Data

(62) Division of application No. 14/196,010, filed on Mar. 4, 2014, now abandoned.
(Continued)

(51) Int. Cl.
*C22C 38/38* (2006.01)
*C21D 8/00* (2006.01)
(Continued)

(52) U.S. Cl.
CPC ............. *C22C 38/38* (2013.01); *C21D 6/005* (2013.01); *C21D 8/005* (2013.01); *C22C 38/02* (2013.01);
(Continued)

(58) Field of Classification Search
CPC ......... C22C 38/38; C22C 38/04; C22C 38/02; C22C 38/06; C22C 38/20; G01N 17/046;
(Continued)

(56) References Cited

U.S. PATENT DOCUMENTS

| 5,304,408 A | 4/1994 | Jarosz et al. |
| 6,358,338 B1 | 3/2002 | Guelton et al. |

(Continued)

FOREIGN PATENT DOCUMENTS

| GB | 2248753 | 4/1992 | |
| WO | WO-2011016676 A2 * | 2/2011 | ............. C22C 38/02 |
| WO | WO 2012052626 | 4/2012 | |

OTHER PUBLICATIONS

The International Search Report and Written Opinion of PCT/US2014/020599 dated Jun. 27, 2014.
(Continued)

*Primary Examiner* — John A Hevey
(74) *Attorney, Agent, or Firm* — Vorys, Safer, Seymour and Pease LLP

(57) ABSTRACT

Improved steel compositions and methods of making the same are provided. The present disclosure provides advantageous wear resistant steel. More particularly, the present disclosure provides high manganese (Mn) steel having enhanced wear resistance, and methods for fabricating high manganese steel compositions having enhanced wear resistance. The advantageous steel compositions/components of the present disclosure improve one or more of the following properties: wear resistance, ductility, crack resistance, ero- (Continued)

sion resistance, fatigue life, surface hardness, stress corrosion resistance, fatigue resistance, and/or environmental cracking resistance. In general, the present disclosure provides high manganese steels tailored to resist wear and/or erosion.

14 Claims, 7 Drawing Sheets

Related U.S. Application Data

(60) Provisional application No. 61/790,274, filed on Mar. 15, 2013.

(51) Int. Cl.
  *C22C 38/02* (2006.01)
  *C22C 38/06* (2006.01)
  *C22C 38/20* (2006.01)
  *C21D 6/00* (2006.01)
  *C22C 38/04* (2006.01)
  *G01N 17/04* (2006.01)
  *C21D 9/08* (2006.01)
  *C21D 9/44* (2006.01)

(52) U.S. Cl.
  CPC .............. *C22C 38/04* (2013.01); *C22C 38/06* (2013.01); *C22C 38/20* (2013.01); *G01N 17/046* (2013.01); *C21D 9/08* (2013.01); *C21D 9/44* (2013.01)

(58) Field of Classification Search
  CPC .......... C21D 6/005; C21D 8/005; C21D 9/08; C21D 9/44; C21D 6/00; C21D 6/002; C21D 8/0226; C21D 8/0263; C21D 2211/001
  See application file for complete search history.

(56) References Cited

U.S. PATENT DOCUMENTS

| | | | |
|---|---|---|---|
| 7,794,552 B2 | 9/2010 | Cugy | |
| 9,650,703 B2 | 5/2017 | Lee | |
| 2007/0163683 A1* | 7/2007 | Schiessl | C21D 9/46 148/526 |
| 2008/0035248 A1 | 2/2008 | Cugy et al. | |
| 2012/0144890 A1* | 6/2012 | Miyasaka | C22F 1/04 72/53 |
| 2012/0160363 A1 | 6/2012 | Jin et al. | |
| 2013/0209833 A1* | 8/2013 | Scott | B32B 15/013 428/659 |
| 2014/0356220 A1 | 12/2014 | Lee | |
| 2014/0373588 A1 | 12/2014 | Lee | |
| 2015/0020928 A1 | 1/2015 | Lee | |
| 2015/0354037 A1* | 12/2015 | Lee | C21D 8/0426 148/620 |

OTHER PUBLICATIONS

Balogun, S.A. et al., "Effect of Melting Temperature on the Wear Characteristics of Austenitic Manganese Steel," Journal of Minerals & Materials Characterization & Engineering, 2008, vol. 7, No. 3, pp. 277-289.

Rajan, T.V. et al., "Heath Treatment of Commercial Steels," Heat Treatment: Principals and Techniques, Second Edition, 2011, pp. 214-215.

Kuyucak, S et al., "Heat Treatment Processing of Austenitic Manganese Steels," 2004, retrieved from the Internet: http://www.academia.edu/800180/HEAT-TREATMENT_PROCESSING_OF_AUSTENITIC_MANGANESE_STEELS.

* cited by examiner

ENHANCED WEAR RESISTANT STEEL AND METHODS OF MAKING THE SAME

CROSS-REFERENCE TO RELATED APPLICATIONS

This application is a divisional application of U.S. patent application Ser. No. 14/196,010, filed Mar. 4, 2014, which claims priority to U.S. Provisional Application Ser. No. 61/790,274, filed Mar. 15, 2013, both of which are incorporated herein by reference in their entirety for all purposes.

FIELD

The present disclosure relates to improved steel compositions and methods of making the same, and more particularly, to high manganese (Mn) steel compositions having enhanced wear resistance and methods for fabricating high manganese steel compositions having enhanced wear resistance.

BACKGROUND

Piping systems are widely used in a variety of settings including, e.g., material conveying systems, fluids/solids transport systems, mining operations, etc. For example, piping systems in mining operations may be used to convey a mixture of solid rock and sand particles in a liquid medium or slurry to the processing plant, as well as to recycle the debris medium back to the mining area. Some current pipe structures for slurry hydro-transport or the like are typically made from low carbon, pipeline grade steel (e.g., API specification 5L X65 or X70 grade steels).

The conveying of slurries or the like often causes the piping system to wear and fail prematurely. The abrasive/erosive wear of piping systems can be produced by relative motion between the pipe wall and hard solid particles in the fluid. For example, the loss of piping materials may be the result of the sharp angular edges of the particles cutting or shearing portions of the pipe wall. As such, frequent repairs and/or replacements are considered the norm, of which entails significant operation costs. Thus, significant economic incentives exist to develop high strength and/or wear resistance pipe materials to improve project economics and reduce operational costs.

In general, various piping materials are available, from low-alloy steels to bi-metallic and metallurgically bonded composite materials. Some advantages of low alloy steel are low cost and general availability. However, this steel has poor abrasion resistance. Although such steel can typically be strengthened to a certain extent by alloying and/or microstructure modification, an increase in material hardness is generally accompanied by a loss in ductility, which is unacceptable for most material conveying systems. The bonded composite steel/pipe typically has a shock resistant outer pipe jacketing and a hardened wear resistant inner pipe. However, the applications of the bonded composite steel/pipe are limited by availability and cost.

There also exists a need for enhanced wear resistant steel in the oil sands mining industry. Such oil sands deposits have been commercially recovered since the 1960's, and the recovery rate has grown recently. The extraction of bitumen ore has generally been extracted either by surface mining techniques for shallow deposits (e.g., less than 100 m depth), or by in-situ thermal extraction (e.g., involving the injection of steam, chemical solvents and/or mixtures thereof) for deep deposits located deeper underground (e.g., around 100 m or deeper). For the surface mining of shallow oil sands, many types of heavy equipment and pipelines are utilized. First, the oil sands are typically excavated using shovels which transfer the mined material to trucks/vehicles. The vehicles move the oil sand ores to ore preparation facilities, where the mined ore is typically crushed and mixed with hot water. The oil sands slurries are then typically pumped through hydro-transport pipelines to the primary separation cell (PSC), where the oil bitumen is generally separated from the sand and water. After the bitumen is separated, the remaining sand and water slurry is then transported through tailing pipelines to tailing ponds for sands to settle down.

For example, the Canadian oil sands resources in northeastern Alberta contain large oil sands deposits covered by shallow overburden, thereby making surface mining an efficient method of oil bitumen extraction. In general, the sands are often mined with shovels and transported to the processing plants by hydro-transport pipelines or the like, where granular material oil sand is typically transported as aqueous slurry. After bitumen extraction, tailings are then typically transported by pipeline from the processing facilities to sites where separation of solids and water occurs. The hydro-transport of large amounts of slurry mixture causes significant metal loss in conventional metallic pipelines or the like, which results in short replacement cycles and considerable cost.

Thus, the oil sands mining and ore preparation processes involve several stress and/or impact abrasion challenges in multiple equipment/operational areas (e.g., shovel teeth, hoppers, crushers, conveyers, vibrating screens, slurry pumps, pipelines, etc.). For example, in the downstream slurry transportation and extraction processes, some of the challenges encountered in the equipment, pipelines (e.g., hydro-transport pipelines), pumps and/or the PSC include erosion, erosion/corrosion, corrosion, stress, wear and/or abrasion or the like of the equipment/materials. These equipment/material erosion/corrosion challenges or the like lead to significant repair, replacement and/or maintenance costs, as well as to production losses.

As noted, current piping structures for slurry hydro-transport are typically made from low carbon, pipeline grade steel (e.g., API specification 5L X70). In general, fast moving solids in the slurry flow can cause considerable metal loss from the pipes (e.g., metal loss of the inner pipe wall). The aqueous and aerated slurry flow also typically causes accelerated pipe erosion by providing for a corrosive environment. Moreover, particulate matter in the slurry (under the influence of gravity) causes damage along, inter alia, the bottom inside half of the pipes. For example, the hydro-transport and tailings pipelines that carry the sand and water slurry in oil sands mining operations undergo severe erosion-corrosion damage during service, while the bottom part (e.g., at the 6 o'clock position) of the pipeline typically experiences the most severe erosion wear.

In order to extend service life of the pipelines some mine operators have utilized the practice of periodically rotating pipelines. For example, the pipelines are occasionally rotated (e.g., after about 1500 hours of service) by about 90°. After about three rotations (e.g., after about 6000 hours of service), the pipelines are typically fully replaced. Various materials, such as martensitic stainless steels, hard-facing materials (e.g., WC-based, chromium-carbide based), and polymer lining materials (e.g., polyurethane), have been evaluated and used by oil sands mining operators. However, such materials have found only niche applications, typically due to either relatively poor wear/erosion performance (e.g., polymer liner) or high material/fabrication costs (e.g., WC-based hard metal, chromium-carbide based hard metal overlay material). However, pipe erosion and the like remains a serious problem, and alternative pipe structures and/or materials are sought to allow for a more efficient/economical operation/solution.

Certain steels containing manganese (Mn) have been known since about the 19th century. The first commercial high Mn steel was invented by English metallurgist Robert Hadfield. "Hadfield steel," with a composition of about 1.0 to about 1.4 weight % carbon, and about 11 to about 14 weight % Mn, exhibits some wear resistance, toughness and high work hardening. However, because of various manufacturing pitfalls and challenges, Hadfield steel has typically been used only as either cast or forged products. For example, Hadfield steel requires high temperature soaking (e.g., normalizing) at temperatures above about 1050° C., followed by water quenching.

Recently, there has been some interest among steel mills in alloys containing more manganese and generally less carbon than the Hadfield steels. Steelmakers have researched the use of Mn steel chemistry for automotive applications. Moreover, automakers have investigated the use of high Mn steel for automotive applications.

Thus, an interest exists for improved steel compositions (e.g., having enhanced wear resistance), and methods for fabricating the same. These and other inefficiencies and opportunities for improvement are addressed and/or overcome by the systems and methods of the present disclosure.

SUMMARY

The present disclosure provides advantageous steel compositions. More particularly, the present disclosure provides improved high manganese (Mn) steel having enhanced wear/erosion resistance, and related methods for fabricating steel having enhanced wear/erosion resistance. In exemplary embodiments, the advantageous steel compositions/components of the present disclosure improve one or more of the following properties: wear resistance, ductility, crack resistance, erosion resistance, fatigue life, surface hardness and/or environmental cracking resistance.

In general, the present disclosure provides for cost-effective high manganese steels having improved wear resistance properties (e.g., step-out wear resistance, erosion resistance, and/or erosion/corrosion resistance). More specifically, the present disclosure provides ferrous steel alloyed with a high amount (e.g., greater than or equal to about 5 weight %) of manganese, and where the fabricated steel exhibits increased/improved wear/abrasion resistance (e.g., improved step-out wear resistance, wear resistance, erosion resistance, and/or erosion/corrosion resistance). The present disclosure also provides methods for fabricating such improved steel. In exemplary embodiments and due to the unique combination of high strength and work hardening rate, the high manganese steels of the present disclosure have advantages/potential in applications where wear and erosion resistances are desired/required.

In certain aspects, the disclosure provides methods for improving the strength, toughness, and wear and erosion resistances of the steels through the control of microstructure and/or chemistry. In certain embodiments, the methods include steps to promote phase transformations (e.g., to alpha prime martensite or epsilon martensite phases), twinning during deformation, and/or introducing hard erosion resistant second phase particles to the compositions.

Some exemplary uses/applications of the steel compositions of present disclosure include, without limitation, use in piping systems, oil sand piping systems, material conveying systems, fluids/solids transport systems, in mining operations, and/or as material for earth-moving equipment and/or drilling components (e.g., where abrasive wear and erosion resistances are important factors, such as oil and gas exploration, production, transportation and petrochemical applications). Moreover, the use of the steels of the present disclosure can improve the economics of oil sands production, and will improve certain materials technologies (e.g., for slurry transport/tailings pipeline, for casing/tubing in in-situ thermal extraction of heavy oils or the like).

Exemplary Methods for Fabrication:

The present disclosure provides for a method for fabricating a ferrous based component including: a) providing a composition having from about 5 to about 40 weight % manganese, preferably from about 9 to about 25 weight % manganese, even more preferably from about 12 to about 20 weight % manganese, and from about 0.01 to about 3.0 weight % carbon, preferably from about 0.5% to about 2.0 weight % carbon, even more preferably from about 0.7% to about 1.5 weight % carbon, and the balance iron, b) heating the composition to a temperature above the austenite recrystallization stop temperature of the composition (e.g., to a temperature to homogenize the composition); c) cooling to a rolling start temperature (RST) d) deforming or hot rolling the composition; and e) quenching or accelerated cooling or air cooling the composition.

The present disclosure provides for a method for fabricating a ferrous based component including: a) providing a composition having from about 5 to about 40 weight % manganese, preferably from about 9 to about 25 weight % manganese, even more preferably from about 12 to about 20 weight % manganese, and from about 0.01 to about 3.0 weight % carbon, preferably from about 0.5% to about 2.0 weight % carbon, even more preferably from about 0.7% to about 1.5 weight % carbon, and the balance iron, b) heating the composition to a temperature above the austenite recrystallization stop temperature of the composition (e.g., to a temperature to homogenize the composition); c) cooling to a rolling start temperature (RST); d) deforming or hot rolling the composition; and e) quenching or accelerated cooling or air cooling the composition.

The present disclosure provides for a method for fabricating a ferrous based component wherein after step d), the matrix of the composition is predominantly or substantially in the austenitic phase. In one or more embodiments, the volume percent of austenite in the steel composition is from about 50 volume % to about 100 volume %, more preferably from about 80 volume % to about 99 volume %, even more preferably from about 90 volume % to about 98 volume %.

The steel composition is preferably processed into predominantly or substantially austenitic plates using a hot rolling process. In one or more embodiments, a steel billet/slab from the compositions described is first formed, such as, for example, through a continuous casting process. The billet/slab can then be re-heated to a temperature ("reheat temperature") within the range of about 1,000° C. to about 1,300° C., more preferably within the range of about 1050° C. to 1250° C., even more preferably within the range of about 1100° C. to 1200° C. Preferably, the reheat temperature is sufficient to: (i) substantially homogenize the steel slab/composition, (ii) dissolve substantially all the carbide and/or nitrides and/or borides and/or carbonitrides, when present, in the steel slab/composition, and (iii) establish fine initial austenite grains in the steel slab/composition.

The re-heated slab/composition can then be hot rolled in one or more passes. In exemplary embodiments, the rolling or hot deformation can be initiated at a "rolling start temperature". In one or more embodiments, the rolling start temperature is above 1100° C., preferably above 1080° C., even more preferably above 1050° C. In exemplary embodiments, the final rolling for plate thickness reduction can be completed at a "rolling finish temperature". In one or more embodiments, the rolling finish temperature is above about 700° C., preferably above about 800° C., more preferably above about 900° C. Thereafter, the hot rolled plate can be cooled (e.g., in air) to a first cooling temperature or accelerated cooling start temperature ("ACST"), at which an accelerated cooling starts to cool the plates at a rate of at least about 10° C. per second to a second cooling temperature or accelerated cooling finish temperature ("ACFT"). After the cooling to the ACFT, the steel plate/composition can be cooled to room temperature (e.g., ambient temperature) in ambient air. Preferably, the steel plate/composition is allowed to cool on its own to room temperature.

In one or more embodiments, the ACST is about 750° C. or more, about 800° C. or more, about 850° C. or more, or about 900° C. or more. In one or more embodiments, the ACST can range from about 700° C. to about 1000° C. In one or more embodiments, the ACST can range from about 750° C. to about 950° C. Preferably, the ACST ranges from a low of about 650° C., 700° C., or 750° C. to a high of about 900° C., 950° C., or 1000° C. In one or more embodiments, the ACST can be about 750° C., about 800° C., about 850° C., about 890° C., about 900° C., about 930° C., about 950° C., about 960° C., about 970° C., about 980° C., or about 990° C.

In one or more embodiments, the ACFT can range from about 0° C. to about 500° C. Preferably, the ACFT ranges from a low of about 0° C., 10° C., or 20° C. to a high of about 150° C., 200° C., or 300° C.

Without being bound by any theory, it is believed that the rapid cooling (e.g., more than about 10° C./sec cooling rate) to the low accelerated cooling finish temperature ("ACFT") retards at least a portion of the carbon and/or nitrogen atoms from diffusing from the austenite phase of the steel composition to the grain boundary or second phase. It is further believed that the high accelerated cooling start temperature ("ACST") retards at least a portion of the carbon and/or nitrogen atoms from forming precipitates such as, for example, carbides, carbonitrides, and/or nitrides during subsequent cooling to the ACFT. As such, the amount of precipitates at the grain boundaries is reduced. Therefore, the steel's fracture toughness and/or resistance to cracking is enhanced.

Following the rolling and cooling steps, the plate can be formed into pipes or the like (e.g., linepipe). Any suitable method for forming pipe can be used. Preferably, the precursor steel plate is fabricated into linepipe by a conventional UOE process or JCOE process which is known in the art.

The present disclosure also provides for a method for fabricating a ferrous based component including: a) providing a composition having from about 5 to about 40 weight % manganese, from about 0.01 to about 3.0 weight % carbon, and the balance iron; b) heating the composition to a temperature above the austenite recrystallization stop temperature of the composition; c) cooling the composition to a temperature below the austenite recrystallization stop temperature of the composition; d) deforming the composition while the composition is at a temperature below the austenite recrystallization stop temperature of the composition; and e) quenching the composition.

The present disclosure also provides for a method for fabricating a ferrous based component wherein after step e), the carbide precipitate fraction volume of the composition is about 20 volume % or less of the composition, preferably about 15 volume % or less of the composition, and even more preferably about 10 volume % or less of the composition. The present disclosure also provides for a method for fabricating a ferrous based component wherein after step e), the composition has a microstructure having a refined grain size of about 100 μm or less, preferably about 50 μm or less, even more preferably about 30 μm or less.

The present disclosure also provides for a method for fabricating a ferrous based component wherein the microstructure having a refined grain size of about 100 μm or less includes a surface layer of the composition. The present disclosure also provides for a method for fabricating a ferrous based component wherein the thickness of the surface layer is from about 10 nm to about 10000 nm. The present disclosure also provides for a method for fabricating a ferrous based component wherein the surface layer is formed prior to or during the use of the composition. The present disclosure provides for a method for fabricating a ferrous based component wherein the surface layer is formed via a surface deformation technique selected from the group consisting of shot peening, laser shock peening, surface burnishing and combinations thereof. The present disclosure provides for a method for fabricating a ferrous based component further including after step e) a surface deformation step selected from the group consisting of shot peening, laser shock peening, surface burnishing and combinations thereof.

The present disclosure provides for a method for fabricating a ferrous based component wherein prior to step e), the composition is slowly cooled or isothermally held. The present disclosure provides for a method for fabricating a ferrous based component wherein step e) includes rapidly quenching the composition. The present disclosure provides for a method for fabricating a ferrous based component wherein step d) includes deforming the composition while the composition is at a temperature below the austenite recrystallization temperature and above the martensite transformation start temperature.

The present disclosure provides for a method for fabricating a ferrous based component wherein step d) includes deforming the composition to induce martensite formation of the composition. The present disclosure provides for a method for fabricating a ferrous based component wherein the composition is deformed at a temperature of from about 18° C. to about 24° C. to induce martensite formation of the composition. The present disclosure provides for a method for fabricating a ferrous based component further including, after step d), heating the composition to a temperature above the austenite recrystallization stop temperature. The present disclosure provides for a method for fabricating a ferrous based component wherein heating the composition to a temperature above the austenite recrystallization stop temperature after step d) reverses deformation-induced martensite of the composition into ultrafine grained austenite. The present disclosure provides for a method for fabricating a ferrous based component wherein the martensite start temperature of the ultrafine grained austenite is below about 24° C.

The present disclosure provides for a method for fabricating a ferrous based component further including, after step e), heating the composition to a temperature above the austenite recrystallization stop temperature, and then quenching the composition. The present disclosure provides for a method for fabricating a ferrous based component further including, prior to step c), deforming the composition while the composition is at a temperature above the austenite recrystallization stop temperature. The present disclosure provides for a method for fabricating a ferrous based component wherein the composition is deformed at a temperature of from about 700° C. to about 1000° C. The present disclosure provides for a method for fabricating a ferrous based component wherein step b) includes heating the composition to at least about 1000° C. The present disclosure provides for a method for fabricating a ferrous based component wherein step c) includes cooling the composition at a rate of from about 1° C. per second to about 60° C. per second.

The present disclosure provides for a method for fabricating a ferrous based component wherein the composition further includes one or more alloying elements selected from the group consisting of chromium, aluminum, silicon, nickel, cobalt, molybdenum, niobium, copper, titanium, tungsten, tantalum, vanadium, nitrogen, boron, zirconium, hafnium and combinations thereof. The present disclosure provides for a method for fabricating a ferrous based component wherein the chromium ranges from 0 to 30 weight % of the total composition, more preferably from 0.5 to 20 weight % of the total composition, even more preferably from 2 to 5 weight % of the total composition; wherein each of the nickel or cobalt ranges from 0 to 20 weight % of the total composition, more preferably from 0.5 to 20 weight % of the total composition, even more preferably from 1 to 5 weight % of the total composition; wherein the aluminum ranges from 0 to 15 weight % of the total composition, more preferably from 0.5 to 10 weight % of the total composition, even more preferably from 1 to 5 weight % of the total composition; wherein each of the molybdenum, niobium, copper, titanium, tungsten, tantalum, or vanadium ranges from 0 to 10 weight % of the total composition, more preferably from 0.02 to 5 weight % of the total composition, even more preferably from 0.1 to 2 weight % of the total composition; wherein the silicon ranges from 0 to 10 weight % of the total composition, more preferably from 0.1 to 6 weight % of the total composition, even more preferably from 0.1 to 0.5 weight % of the total composition; wherein the nitrogen ranges from 0 to 3.0 weight % of the total composition, more preferably from 0.02 to 2.0 weight % of the total composition, even more preferably from 0.08 to 1.5 weight % of the total composition; wherein the boron ranges from 0 to 0.1 weight % of the total composition, more preferably from 0.001 to 0.1 weight % of the total composition; and wherein each of the zirconium or hafnium ranges from 0 to 6 weight % (e.g., 0.2 to 5 wt %) of the total composition.

The present disclosure provides for a method for fabricating a ferrous based component wherein the composition includes from about 8 to about 25 weight % manganese, from about 0.60 to about 3.0 weight % carbon, from about 0.05 to about 5 weight % chromium, from about 0.0 to about 5.0 weight % copper, from about 0.01 to about 7 weight % silicon, and the balance iron.

The present disclosure provides for a method for fabricating a ferrous based component wherein step d) includes transformation induced plasticity or twin-induced plasticity.

The present disclosure also provides for a ferrous based component including a composition having from about 5 to about 40 weight % manganese, from about 0.01 to about 3.0 weight % carbon, and the balance iron; and wherein the carbide precipitate fraction volume of the composition is about 20 volume % or less of the composition.

The present disclosure also provides for a ferrous based component including a composition having from about 5 to about 40 weight % manganese, from about 0.01 to about 3.0 weight % carbon, and the balance iron; and wherein the composition has a microstructure having a refined grain size of about 150 µm or less.

The present disclosure also provides for a ferrous based component including a composition having from about 5 to about 40 weight % manganese, from about 0.01 to about 3.0 weight % carbon, and the balance iron; and wherein the composition has a tensile yield strength of 300 MPa or higher at ambient temperature.

The present disclosure also provides for a ferrous based component including a composition having from about 5 to about 40 weight % manganese, from about 0.01 to about 3.0 weight % carbon, and the balance iron; and wherein the composition has a ultimate tensile strength of 600 MPa or higher at ambient temperature.

The present disclosure also provides for a ferrous based component including a composition having from about 5 to about 40 weight % manganese, from about 0.01 to about 3.0 weight % carbon, and the balance iron; and wherein the composition has a tensile uniform elongation of 7% or higher at ambient temperature.

The present disclosure also provides for a ferrous based component including a composition having from about 5 to about 40 weight % manganese, from about 0.01 to about 3.0 weight % carbon, and the balance iron; and wherein the composition has a Charpy impact energy of about 20J or higher at −40° C.

The present disclosure also provides for a ferrous based component including a composition having from about 5 to about 40 weight % manganese, from about 0.01 to about 3.0 weight % carbon, and the balance iron; and wherein the composition has a wear and/or erosion resistance of about 2 times or higher than that of API 5L X70 grade carbon steels.

The present disclosure also provides for a ferrous based component fabricated according to the steps comprising: a) providing a composition having from about 5 to about 40 weight % manganese, from about 0.01 to about 3.0 weight % carbon, and the balance iron; b) heating the composition to a temperature above the austenite recrystallization stop temperature of the composition; c) cooling the composition to a temperature below the austenite recrystallization stop temperature of the composition; d) deforming the composition while the composition is at a temperature below the austenite recrystallization stop temperature of the composition; and e) quenching the composition.

Any combination or permutation of embodiments is envisioned. Additional advantageous features, functions and applications of the disclosed systems and methods of the present disclosure will be apparent from the description which follows, particularly when read in conjunction with the appended figures. All references listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various steps, features and combinations of steps/features described below and illustrated in the figures can be arranged and organized differently to result in embodiments which are still within the spirit and scope of the present disclosure. To assist those of ordinary skill in the art in making and using the disclosed systems, assemblies and methods, reference is made to the appended figures, wherein.

DETAILED DESCRIPTION

Figure 1:
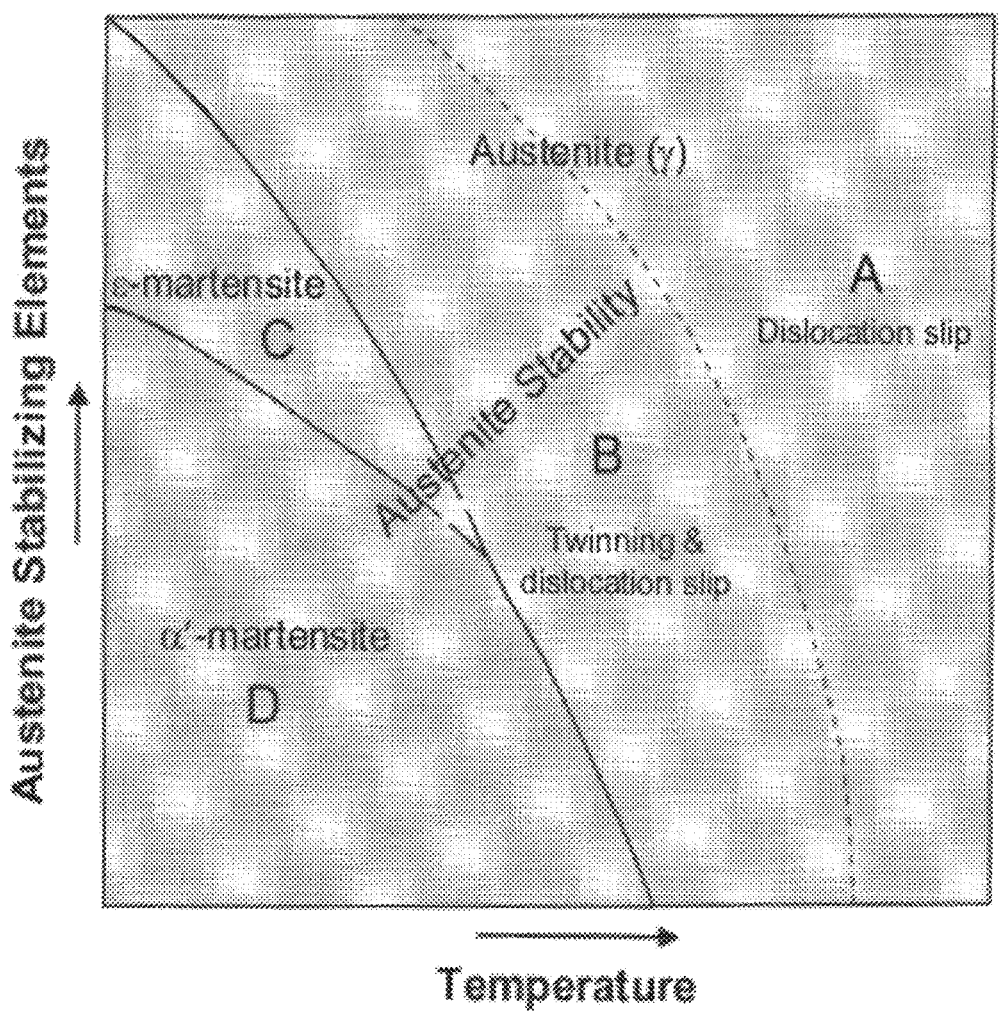
FIG. 1 is an exemplary diagram of the phase stability and deformation mechanism of high Mn steels as a function of alloy chemistry and temperature.

The exemplary embodiments disclosed herein are illustrative of advantageous steel compositions, and systems of the present disclosure and methods/techniques thereof. It should be understood, however, that the disclosed embodiments are merely exemplary of the present disclosure, which may be embodied in various forms. Therefore, details disclosed herein with reference to exemplary steel compositions/fabrication methods and associated processes/techniques of assembly and use are not to be interpreted as limiting, but merely as the basis for teaching one skilled in the art how to make and use the advantageous steel compositions of the present disclosure. Drawing figures are not necessarily to scale and in certain views, parts may have been exaggerated for purposes of clarity.

All numerical values within the detailed description and the claims herein are modified by "about" or "approximately" the indicated value, and take into account experimental error and variations that would be expected by a person having ordinary skill in the art.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. Ranges from any lower limit to any upper limit are contemplated. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Although any methods and materials similar or equivalent to those described herein can also be used in the practice or testing of the present invention, the preferred methods and materials are now described. All publications mentioned herein are incorporated herein by reference to disclose and described the methods and/or materials in connection with which the publications are cited.

It must be noted that as used herein and in the appended claims, the singular forms "a", "and", and "the" include plural references unless the context clearly dictates otherwise.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Definitions

CRA: Corrosion resistant alloys, can mean, but is in no way limited to, a specially formulated material used for completion components likely to present corrosion problems. Corrosion-resistant alloys may be formulated for a wide range of aggressive conditions.

Ductility: can mean, but is in no way limited to, a measure of a material's ability to undergo appreciable plastic deformation before fracture; it may be expressed as percent elongation (% EL) or percent area reduction (% AR).

Erosion resistance: can mean, but is in no way limited to, a material's inherent resistance to erosion when exposed to moving solid particulates striking the surface of the material.

Toughness: can mean, but is in no way limited to, resistance to fracture initiation.

Fatigue: can mean, but is in no way limited to, resistance to fracture under cyclic loading.

Yield Strength: can mean, but is in no way limited to, the ability to bear load without deformation.

Cooling rate: can mean, but is in no way limited to, the rate of cooling at the center, or substantially at the center, of the plate thickness.

Austenite: can mean, but is in no way limited to, a solid solution of one or more elements in face-centered cubic crystallographic structure of iron; the solute can be, but not limited to, carbon, nitrogen, manganese, and nickel. Martensite: can mean, but is in no way limited to, a generic term for microstructures formed by diffusionless phase transformation in which the parent (typically austenite) and product phases have a specific orientation relationship.

ε (epsilon)-martensite: can mean, but is in no way limited to, a specific form of martensite having hexagonal close packed crystal structure which forms upon cooling or straining of austenite phase. ε-martensite typically forms on close packed (111) planes of austenite phase and is similar to deformation twins or stacking fault clusters in morphology.

α' (alpha prime)-martensite: can mean, but is in no way limited to, a specific form of martensite having body centered cubic or body centered tetragonal crystal structure which forms upon cooling or straining of austenite phase; α'-martensite typically forms as platelets.

$M_s$ temperature: can mean, but is in no way limited to, the temperature at which transformation of austenite to martensite starts during cooling.

$M_f$ temperature: can mean, but is in no way limited to, the temperature at which transformation of austenite to martensite finishes during cooling.

$M_d$ temperature: can mean, but is in no way limited to, the highest temperature at which a designated amount of martensite forms under defined deformation conditions. Md temperature is typically used to characterize the austenite phase stability upon deformation.

Carbide: can mean, but is in no way limited to, a compound of iron/metal and carbon.

Cementite: can mean, but is in no way limited to, a compound of iron and carbon having approximate chemical formula of $Fe_3C$ with orthorhombic crystal structure.

Pearlite: can mean, but is in no way limited to, typically a lamellar mixture of two-phases, made up of alternate layers of ferrite and cementite ($Fe_3C$).

Grain: can mean, but is in no way limited to, an individual crystal in a polycrystalline material.

Grain boundary: can mean, but is in no way limited to, a narrow zone in a metal corresponding to the transition from one crystallographic orientation to another, thus separating one grain from another.

Quenching: can mean, but is in no way limited to, accelerated cooling by any means whereby a fluid selected for its tendency to increase the cooling rate of the steel is utilized, as opposed to air cooling.

Accelerated cooling start temperature (ACST): can mean, but is in no way limited to, the temperature reached at the surface of plate, when quenching is initiated.

Accelerated cooling finish temperature (ACFT): can mean, but is in no way limited to, the highest, or substantially the highest, temperature reached at the surface of the plate, after quenching is stopped, because of heat transmitted from the mid-thickness of the plate.

Slab: a piece of steel having any dimensions.

Recrystallization: the formation of a new, strain-free grain structure grains from cold-worked metal accomplish by heating through a critical temperature.

$T_{nf}$ temperature: the temperature below which austenite does not recrystallize.

The present disclosure provides advantageous steel compositions (e.g., having enhanced wear resistance). More particularly, the present disclosure provides improved high manganese (Mn) steel having enhanced wear resistance, and methods for fabricating high manganese steel compositions having enhanced wear resistance. In exemplary embodiments, the advantageous steel compositions/components of the present disclosure improve one or more of the following properties: wear resistance, ductility, crack resistance, erosion resistance, fatigue life, surface hardness, stress corrosion resistance, fatigue resistance, and/or environmental cracking resistance.

In one aspect, the disclosure provides methods for improving the strength, toughness, and wear and erosion resistances of the steels through the control of microstructure and/or chemistry. In certain embodiments, the strength, toughness, wear resistance and/or erosion resistance of the steel compositions of the present disclosure can be improved/increased through the control of microstructure and/or chemistry. Some such possible routes include promoting phase transformations (e.g., to martensite/epsilon phases), twinning during deformation, and/or introducing hard erosion resistant second phase particles to the compositions.

In another aspect, the present disclosure provides high manganese steels tailored to resist wear and/or erosion (e.g., having improved wear/erosion resistance properties). In general, due to the unique combination of high strength and work hardening rate, the high manganese steels of the present disclosure have advantages/potential in applications where wear and/or erosion resistances are desired/required (e.g., oil and gas exploration, production, transportation and petrochemical applications).

Any of the steel compositions as described or embraced by the present disclosure may be advantageously utilized in many systems/applications (e.g., piping systems, oil sand piping systems, material conveying systems, fluids/solids transport systems, in mining operations, and/or as material for earth-moving equipment and/or drilling components), particularly where abrasive wear and erosion resistances are important/desired. In exemplary embodiments, the systems/methods of the present disclosure provides for low-cost, high strength and wear/erosion resistance steels (e.g., to be utilized in the manufacture of high performance slurry transport lines, etc.).

As discussed in further detail below, the fabrication methods/systems of the present disclosure can include one or more of the following steps: (i) providing a high work hardening rate matrix, through transformation induced plasticity ("TRIP") and/or twin-induced plasticity ("TWIP"); (ii) providing meta-stability to induce phase transformation during service; (iii) providing optimum hardness of martensite (e.g., to be controlled by dissolved carbon content, to provide required erosion resistance); (iv) the dispersion of second phase particles (e.g., carbides, quasi-crystals, etc.) of varying size ranges within the compositions; (v) utilization of advantageous thermo-mechanical controlled process ("TMCP") fabrication steps/schemes (e.g., to achieve at least some of the steps above); and/or (vi) exemplary joining methods, such as solid state joining (e.g., Friction Stir Welding).

In general, the high manganese steels of the present disclosure are relatively inexpensive alloys, and have potential applications where wear resistance or the like of working components is important. In certain embodiments, the steel compositions have from about 0.60 to about 1.50 weight % carbon, and from about 11 to about 20 weight % manganese.

In exemplary embodiments, the steel has a fully austenitic structure obtained by quenching from a temperature above about 1000° C. In this condition, the hardness of the material is relatively low. One particularly advantageous feature of the high manganese steel is the strong work hardening capability. Under impact or other mechanical stress, the surface layer can increase its hardness rapidly by martensitic transformation or twinning, whereas other portions/parts of the steel remain substantially soft and/or ductile. This combination of low cost and high work hardening rate makes these steels advantageously suitable to be applied as wear resistant piping material or the like.

In general, the present disclosure provides for steels that exhibit a combination of high strength and erosion resistance. Also, as the result of their good formability, the high manganese steels as described herein can be used in a variety of settings, including, mining and automotive applications.

As noted, the present disclosure relates to high manganese steel chemistry and/or microstructures tailored to achieve step out wear, erosion resistance and/or corrosion resistance. In exemplary embodiments, surface grain refinement may take place in a surface layer of certain high Mn steels either prior to and/or during service/use (e.g., formed in-situ). For example, the grain refinement at the surface can result in the formation of a layer which possesses the unique combinations of high strength and hardness, high ductility, and/or high toughness. Such fine grained (e.g., about 100 nm layer in height) or ultrafine grained (e.g., about 10 nm layer in height) surface layer may be formed either prior to and/or during service/use (e.g., formed in-situ), and can impart step-out wear resistance, erosion resistance, and/or corrosion resistance to the steel.

In exemplary embodiments, such fine grained (e.g., about 100 nm layer) or ultrafine grained (e.g., about 10 nm layer) surface layer may be formed prior to use/installation of the exemplary steel by such surface deformation techniques such as, without limitation, shot peening, laser shock peening, and/or surface burnishing.

Current practice provides that the mechanical loads against the pipes in some piping systems are not strong enough to cause the maximum work hardening of the steel. In exemplary embodiments, the present disclosure provides high manganese steel with improved wear resistance, which can provide pipes for piping systems with advantageous wear life expectancies.

Current practice also provides that the steel in material conveying systems (e.g., piping systems, heavy equipment, etc.) often wears and/or fails prematurely, which leads to significant repair, replacement and/or maintenance/production costs. In exemplary embodiments, the present disclosure provides for cost-effective steel compositions having improved wear/corrosion/abrasion resistance properties, thereby providing a significant commercial, manufacturing and/or operational advantage as a result.

In additional exemplary embodiments, the present disclosure provides for ferrous based components/compositions containing manganese. In certain embodiments, the components/compositions include from about 5 to about 40 weight % manganese, from about 0.01 to about 3.0 weight % carbon, and the balance iron. The components/compositions can also include one or more alloying elements, such as, without limitation, chromium, nickel, cobalt, molybdenum, niobium, copper, titanium, vanadium, nitrogen, boron and combinations thereof. Exemplary ferrous based components/compositions containing manganese (and optionally other alloying elements) are described and disclosed in U.S. Patent Pub. No. 2012/0160363, the entire contents of which is hereby incorporated by reference in its entirety.

Component Composition:

In exemplary embodiments and as noted above, the ferrous based compositions include from about 5 to about 40 weight % manganese, from about 0.01 to about 3.0 weight % carbon, and the balance iron.

As such, the manganese level in the compositions may range from about 5 to 40 wt % of the total component/composition. The carbon level in the component/composition may range from 0.01 to 3.0 wt % of the total component/composition. In general, iron constitutes the substantial balance of the component/composition.

The components/compositions can also include one or more alloying elements, such as, without limitation, chromium, aluminum, nickel, cobalt, molybdenum, niobium, copper, titanium, vanadium, nitrogen, boron, zirconium, hafnium and combinations thereof. Weight percentages are based upon the weight of the total component/composition.

Chromium may be included in the component from about 0 to about 30 wt % (more preferably from 0.05 to 20 weight % of the total composition, even more preferably from 1 to 5 weight % of the total composition). Nickel may be included in the component from about 0 to about 20 wt % (more preferably from 0.05 to 20 weight % of the total composition, even more preferably from 1 to 5 weight % of the total composition). Cobalt may be included in the component from about 0 to about 20 wt % (more preferably from 0.05 to 20 weight % of the total composition, even more preferably from 1 to 5 weight % of the total composition). Aluminum may be included in the component from about 0 to about 15 wt % (more preferably from 0.05 to 10 weight % of the total composition, even more preferably from 1 to 5 weight % of the total composition. Molybdenum may be included in the component from about 0 to about 10 wt % (more preferably from 0.2 to 5 weight % of the total composition, even more preferably from 0.1 to 2 weight % of the total composition). Silicon may be included in the component from about 0 to about 10 wt % (more preferably from 0.1 to 6 weight % of the total composition, even more preferably from 0.1 to 0.5 weight % of the total composition). Niobium, copper, tungsten, tantalum, titanium and/or vanadium can each be included in the component from about 0 to about 10 wt % (more preferably from 0.02 to 5 weight % of the total composition, even more preferably from 0.1 to 2 weight % of the total composition). Nitrogen can be included in the component from about 0.001 to about 3.0 wt % (more preferably from 0.02 to 2.0 weight % of the total composition, even more preferably from 0.05 to 1.5 weight % of the total composition). Boron can be included in the component from about 0 to about 1 wt % (more preferably from 0.001 to 0.1 weight % of the total composition).

The ferrous based components/compositions containing manganese may also include another alloying element selected from the group consisting of zirconium, hafnium, lanthanium, scandium, cerium and combinations thereof. Each of these other alloying elements may be included in the component/composition in ranges from about 0 to about 6 wt % (e.g., 0.02 to 5 wt %) based on the total weight of the component/composition.

In general, the mechanical properties of the high Mn steels of the present disclosure are dependent on the characteristics of strain-induced transformation, which is typically controlled by the chemical composition of the steels and/or the processing temperatures. Unlike conventional carbon steels, high Mn steels include a metastable austenite phase with a face centered cubic (fcc) structure at ambient temperature (e.g., 18-24° C.).

Upon straining, the metastable austenite phase can transform into several other phases through strain-induced transformation. More particularly, the austenite phase could transform into microtwins (fcc) structure (twin aligned with matrix), ε-martensite (hexagonal lattice), and α'-martensite (body centered tetragonal lattice), depending on steel chemistry and/or temperature.

These transformation products could impart a range of unique properties to high Mn steels. For example, fine microtwins effectively segment primary grains and act as strong obstacles for dislocation gliding. This leads to effective grain refinement which results in an excellent combination of high ultimate strength and ductility.

Chemical composition and temperature are known to be primary factors controlling the strain-induced phase transformation pathways as shown in FIG. 1. In general, high Mn steels can be divided into four groups depending on the stability of austenite phase upon straining and temperature, e.g., stable (A), mildly metastable (B), moderately metastable (C) and highly metastable (D) Mn steel. The metastability of these phases is affected by both temperature and strain. These steels would tend to be more metastable (e.g., higher tendency to transform) at lower temperatures and higher strains.

FIG. 1 is an exemplary diagram of the phase stability and deformation mechanism of high Mn steels as a function of alloy chemistry and temperature. The letters (A, B, C, and D) indicate the various methods of transformation during deformation. In this diagram, steel A would deform by slip (similar to other metals and alloys), while steels B-D would transform during deformation.

Steel in area A, with high Mn content (e.g., greater than or equal to about 25 wt %), has stable austenite and deforms primarily by dislocation slip upon mechanical straining. In general, steels with a fully stabilized austenitic structure show lower mechanical strength but remain tough at cryogenic temperatures, provide low magnetic permeability and are highly resistant to hydrogen embrittlement.

Steel in area B, which is mildly metastable, can be produced with intermediate manganese content (e.g., from about 15 to about 25 wt % Mn, and about 0.6 wt % C). These steels form twins during deformation. A large amount of plastic elongation can be achieved by the formation of extensive deformation twins along with dislocation slip, a phenomenon known as Twinning-Induced Plasticity (TWIP). Twinning causes a high rate of work hardening as the microstructure is effectively refined, as the twin boundaries act like grain boundaries and strengthen the steel due to the dynamic Hall-Petch effect. TWIP steels combine extremely high tensile strength (e.g., greater than 150 ksi) with extremely high uniform elongation (e.g., greater than 95%), rendering them highly attractive for many applications.

The moderately metastable steels (Steel in area C) can transform into ε-martensite (hexagonal lattice) upon straining. Upon mechanical straining, these steels would deform predominantly by the formation of ε-martensite, along with dislocation slip and/or mechanical twinning.

The highly metastable steels (Steel in area D) will transform to a strong body-centered cubic phase (referred to as α'-martensite) upon deformation. This strong phase provides resistance to erosion resulting from the impingement of external, hard particles. Since the impact of the external particles results in the deformation of the near surface regions of the steel, these surface regions will transform during service, thereby providing resistance to erosion. Therefore, these steels have a "self-healing" characteristic in the sense that if the hard surface layer gets damaged, it would reform by the impact of the service.

Thus, the chemistry of the high Mn steels can be tailored to provide a range of properties (e.g., wear resistance, cryogenic toughness, high formability, erosion resistance) by controlling their transformation during deformation.

Other Alloying Concepts in High Mn Steels:

Alloying elements in high Mn steels determine the stability of the austenite phase and strain-induced transformation pathways. In general, manganese is the main alloying element in high Mn steels, and it is important in stabilizing the austenitic structure both during cooling and deformation. In the Fe—Mn binary system, with increasing Mn content, the strain induced phase transformation pathway changes from α'-martensite to ε-martensite and then to micro-twinning.

Carbon is an effective austenite stabilizer and the carbon solubility is high in the austenite phase. Therefore, carbon alloying can be used to stabilize the austenite phase during cooling from the melt and during plastic deformation. Carbon also strengthens the matrix by solid solution hardening. As noted, the carbon in the components/compositions of the present disclosure may range from about 0.01 to about 3.0 wt % of the total component/composition.

Aluminum is a ferrite stabilizer and thus destabilizes austenite phase during cooling. The addition of aluminum to high Mn steels, however, stabilizes the austenite phase against strain-induced phase transformation during deformation. Furthermore, it strengthens the austenite by solid solution hardening. The addition of aluminum also enhances the corrosion resistance of the high Mn containing ferrous based components disclosed herein due to its high passivity. The aluminum in the components/compositions of the present disclosure may range from about 0.0 to about 15 wt % of the total component.

Silicon is a ferrite stabilizer and sustains the α'-martensite transformation while promoting ε-martensite formation upon deformation at ambient temperature. Due to solid solution strengthening, addition of Si strengthens the austenite phase by about 50 MPa per 1 wt % addition of Si. The silicon in the components/compositions of the present disclosure may range from about 0.01 to about 10 wt % of the total component.

Chromium additions to high Mn steel alloys enhance the formation of ferrite phase during cooling and increase corrosion resistance. Furthermore, the addition of Cr to the Fe—Mn alloy system reduces the thermal expansion coefficient. The chromium in the components/compositions of the present disclosure may range from about 0.05 to about 30 wt % of the total component.

Based on the understanding of these alloying element effects on strain-induced phase transformation, suitable steel chemistries can be designed for specific applications. Some criteria for the design of high Mn steels can be the critical martensite transformation temperatures, e.g., $M_s$ and $M_{cs}$. $M_s$ is a critical temperature below which austenite to α'-martensite transformation occurs, and $M_s$ is a critical temperature below which austenite to ε-martensite transformation takes place.

The effects of alloying elements on $M_s$ and $M_{cs}$ can be expressed as follows (unit of alloying elements in weight percent, and where $A_3$ is a critical temperature above which all ferrite phases (including α'- and ε-martensite phases) transform to austenite):

$$M_s(K) = A_3 - 410 - 200(C+1.4N) - 18Ni - 22Mn - 7Cr - 45Si - 56Mo;\text{ and}$$

$$M_{cs}(K) = 670 - 710(C+1.4N) - 19Ni - 12Mn - 8Cr + 13Si - 2Mo - 23Al$$

In general, only austenite to α'-martensite transformation takes place if $M_s$ is much higher than $M_{cs}$. If $M_{cs}$ is much higher than $M_s$, only austenite to ε-martensite transformation takes place. Both α'-martensite and ε-martensite phase transformation occur if $M_s$ and $M_{cs}$ are close to each other.

It is noted that the ferrous based components/compositions containing manganese may be utilized in a wide variety of applications/uses/systems (e.g., piping systems, oil sand piping systems, material conveying systems, fluids/solids transport systems, in mining operations, and/or as material for earth-moving equipment and/or drilling components).

For example, as described and disclosed in U.S. Patent Pub. No. 2012/0160363 noted above, the ferrous based components/compositions containing manganese of the present disclosure may find numerous non-limiting uses/applications in the oil, gas and/or petrochemical industry or the like (e.g., cryogenic applications, corrosion resistant applications, erosion resistant applications, natural gas liquefaction/transportation/storage type structures/components, oil/gas well completion and production structures/components, subterraneous drilling equipment, oil/gas refinery and chemical plant structures/components, coal mining structures/equipment, coal gasification structures/equipment, etc.).

The relatively low alloying content (e.g., less than about 20 wt % Mn, and about 1.5 wt % C) produces the highly metastable austenite phase. The highly metastable austenite phase often transforms into hard α'-martensite upon straining, which typically is an irreversible transformation. Upon surface wear of these steels, a surface layer of the highly metastable austenite phase can transform to α'-martensite phase. This friction-induced phase transformation leads to the formation of a thin, hard surface layer composed of martensite over an interior that consists of tough, untransformed austenite. This unique combination renders high Mn steels suitable for wear/erosion and impact resistant applications.

Moreover, the joining of the high Mn steels of the present disclosure can be performed using conventional (e.g., fusion, resistance welding, etc.) and emerging joining methods (e.g., laser, electron beam, friction stir welding, etc.), as described and disclosed in U.S. Patent Pub. No. 2012/0160363 noted above. In exemplary embodiments, preferred joining methods include solid state welding methods (e.g., resistance welding, friction stir welding), where such welding methods do not require the use of a weld metal, although the present disclosure is not limited thereto.

Bulk Modification:

The systems/methods of the present disclosure provide/produce high Mn steel having, inter alia, excellent abrasive wear resistance. The high strength and work hardening rate of the steel compositions of the present disclosure reduce the material losses of the steel during abrasion.

Figure 2:
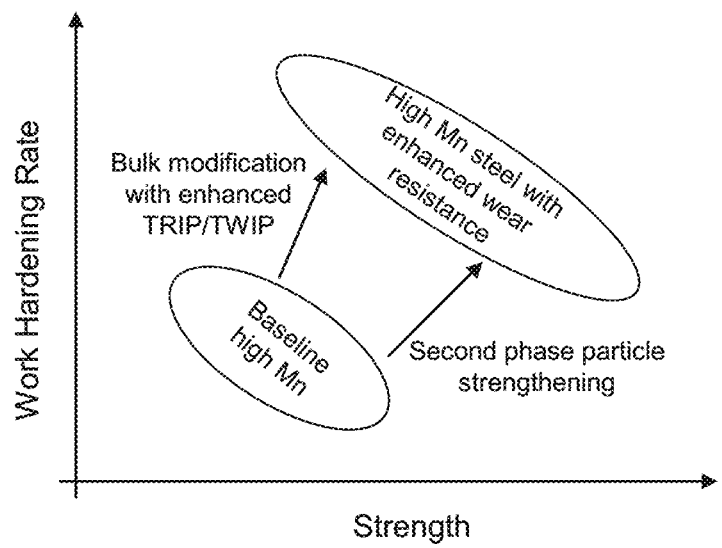
FIG. 2 depicts exemplary approaches to improve the high Mn steel wear resistance.

Some potential metallurgical approaches to enhance the materials of the present disclosure are shown in FIG. 2. As such, FIG. 2 depicts exemplary approaches to improve the high Mn steel wear resistance. The bulk chemistry modification and second phase particle strengthening is depicted in FIG. 2.

In exemplary embodiments, bulk modification is utilized to promote phase transformation (TRIP) and twinning (TWIP) during deformation. In general, the dispersed particles strengthen the materials/compositions, but have complex effects. It is noted that the dispersed particles may influence the: (i) chemistry of the composition matrix itself, (ii) grain size, and (iii) overall material/composition toughness. In general, the proper balance of these effects is important to exemplary embodiments of the present disclosure.

High manganese steel generally has a rapid work hardening rate because of the TRIP/TWIP effects. Their activations are typically triggered by the value of the stacking fault energy ("SFE") of the alloy. It is noted that the plastic deformation is associated with martensitic transformation at low SFE values (e.g., less than about 12 mJ/m$^2$), and by twinning at intermediate SFE values. At even higher SFE values (e.g., greater than 35 mJ/m$^2$), plasticity and strain hardening is typically controlled solely by dislocation sliding. As such, the SFE value is an important parameter in steel design.

The SFE is a function of alloy chemistry and temperature. The intrinsic stacking fault can be represented as a ε-martensite embryo of two planes in thickness. The SFE includes both volume energy and surface energy contributions. It has been demonstrated that the chemistry and temperature dependence of SFE arises largely from the volume energy difference between s-martensite and austenite. Moreover, the volume free energy of phases can be obtained from available databases or the like.

Figure 3:
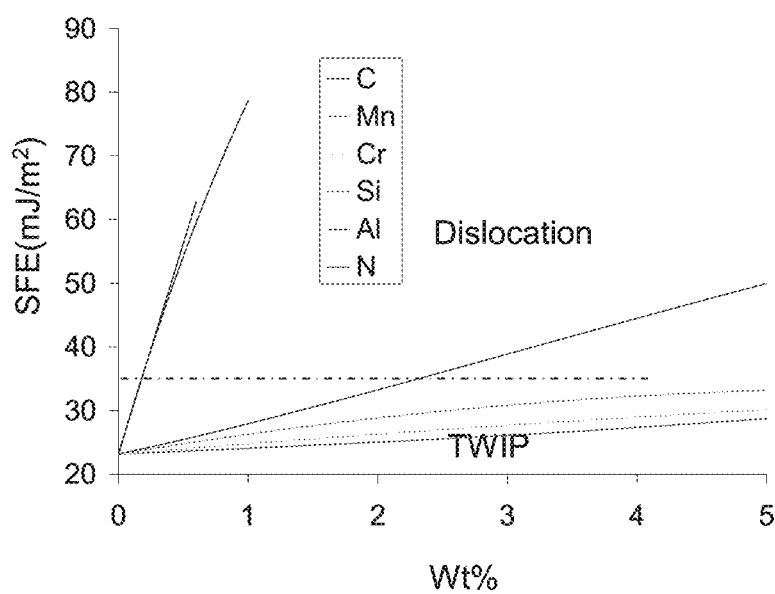
FIG. 3 displays the predicted influence of alloying elements on the SFE values of the FeMn13C0.6 reference and the deformation mechanism.

FIG. 3 shows the predicted SFE values when adding each alloying element to FeMn13C0.6. Stated another way, FIG. 3 displays the predicted influence of alloying elements on the SFE values of the FeMn13C0.6 reference and the deformation mechanism.

As shown in FIG. 3, the SFE contribution from the addition of various alloying elements is different. Carbon has the strongest effect, and manganese has the smallest influences. When the interaction of multiple alloying elements is considered, the dependence of SFE on chemistry will be complex and non-monotonic. In general, the deformation mechanism can be controlled by properly tailoring the bulk chemistry.

Second Phase Particle Dispersion Strengthening:

In exemplary embodiments, the systems/methods of the present disclosure also include the introduction of second phase particles to further improve the wear resistance of the exemplary steel compositions. In certain non-limiting embodiments the exemplary systems/methods are described primarily with respect to carbide/nitride particles. However, it is noted that the systems/methods of the present disclosure may utilize, apply to and/or include other particles/precipitates, such as, without limitation, borides and oxides. In exemplary embodiments, when primarily carbide/nitride and oxide particles are considered, the grain size refinement can be an additional benefit from the second phase particles.

In general, the size and spatial distribution of the particles are important. It has been demonstrated that the effectiveness of the particles on the steel/material strengthening increases with decreasing particle size. Thus, fine particles generally contribute to the material wear resistance largely by strengthening the materials, while coarse particles typically provide additional resistance to erosive damage.

It is noted that the size and/or spatial distribution of the particles can be adjusted or optimized based on materials service conditions. For example, for compositions for us in a piping system or the like, the wear damage may be caused by sands having wide particle size distribution. Therefore, a bimodal particle distribution could be considered for the steel composition. It is noted that the fabrication or manufacture of high manganese steel with various type and size second phase particle can be achieved through various exemplary thermo-mechanical controlled processes ("TMCP"), as discussed further below.

In certain embodiments, the carbide/nitride precipitation can also locally enhance the TRIP or TWIP effects in the austenitic matrix. The interstitial elements (carbon and nitrogen) concentration in carbide/nitride particles is much higher than the average value of the steel. Due to diffusion gradients at the interface, the interstitial elements could be depleted in precipitates surrounding the matrix, which results in a lower activation energy for TRIP or TWIP.

Figure 4:
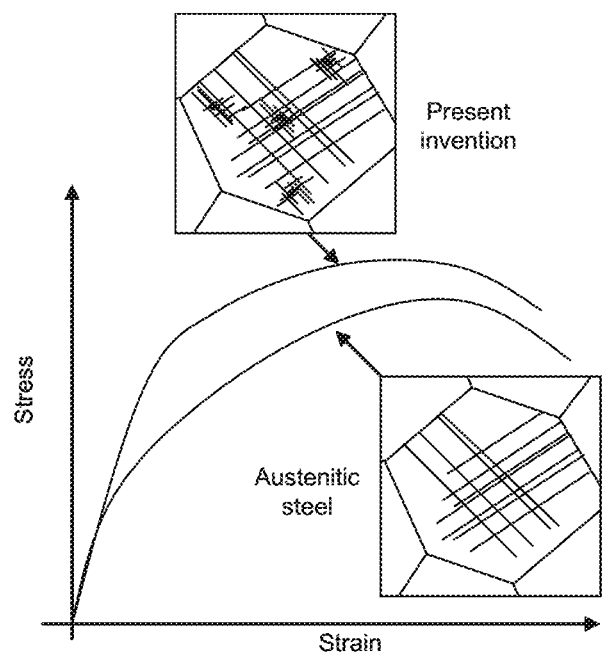
FIG. 4 depicts the effect of carbide precipitates on mechanical properties and deformation mechanism (schematic, not in scale)

FIG. 4 (schematic, not in scale) displays the overall effect of carbide precipitates on mechanical properties and the corresponding deformation mechanism. Compared to the fully austenitic steel with substantially the same chemistry, the high manganese steel with the exemplary carbide/nitride particles can have a higher yield strength and work hardening capability. In exemplary embodiments, the combination of hard particles and a work-hardenable material matrix makes the compositions of the present disclosure suitable to withstand and/or reduce the abrasive wear effects caused by operational use (e.g., by hard particle cutting/shearing or the like).

Fabrication and Microalloying:

The steel compositions/components of the present disclosure can be fabricated or manufactured by various processing techniques including, but not limited to, various exemplary thermo-mechanical controlled processing ("TMCP") techniques, steps or methods. In general, some TMCP processes have been utilized to produce low alloy steel, particularly where grain size and microstructure refinement is desired.

In exemplary embodiments, to produce the desired carbide/nitride particles, the particles should be in a substantially dissolved state before the deformation, as undissolved particles will suffer relatively rapid coarsening at the elevated temperatures. The controlled deformation should take place below the recrystallization stop temperature so that deformation results in elongated austenite grains filled with intra-granular crystalline defects, which are the preferred sites for nucleation.

A slow cooling or isothermal holding is then required to promote the particles precipitation. Finally, a rapid quench is applied to keep a fully austenitic matrix.

Figure 5:
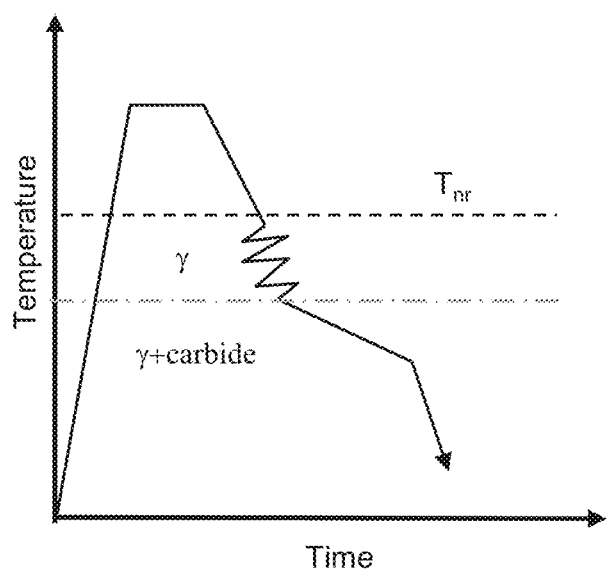
FIG. 5 is a schematic drawing of an exemplary steel fabrication method of the present disclosure.

FIG. 5 illustrates an exemplary fabrication schedule for the production of steel compositions/components according to the present disclosure. As such, FIG. 5 is a schematic drawing of an exemplary steel fabrication method of the present disclosure. As shown in FIG. 5, $T_{nr}$ is the austenite recrystallization stop temperature, and $A_s$ is the austenite start temperature.

In exemplary embodiments, the TMCP methods have a synergistic effect of micro-alloy additions. Depending on the alloying elements to be added/utilized in the composition, the appropriate thermo-mechanical conditions should be selected in order to produce the desired fine particles. In general, the alloying elements utilized in the methods of the present disclosure can have some effect on either the TMCP, or the bulk property modification, or both.

In certain embodiments, carbon is the one of the most effective alloying elements to control the bulk deformation mechanism, promote carbide precipitation and stabilize the austenite phase during cooling. It is noted that the total carbon content of the compositions could be much larger or higher compared to conventional high manganese steel, but the amount of carbon in solution after TMCP steps should be controlled to a much lower level.

In exemplary embodiments, manganese is the austenite phase stabilizer. This element can be mainly added to the compositions to maintain a fully austenitic matrix during cooling and TMCP. In general, it has little effect on the deformation mechanism.

Chromium is a carbide former. It will promote different types of carbide, such as M7C and M23C6, depending on the alloy level and/or thermal treatment temperature. Moreover, chromium addition is typically important for corrosion resistance enhancement.

Niobium, vanadium, tantalum and titanium are effective elements to retard the recrystallization during TMCP by forming strain induced (e.g., (Ti, Nb) (C, N)) precipitation on the deformed austenite. In addition, the niobium, and/or vanadium, and/or tantalum and/or titanium addition facilitates the bulk carbon concentration modification according to exemplary embodiments of the present disclosure.

Aluminum and silicon are added to tune or adjust the SFE of the high manganese steel of the present disclosure. It is noted that aluminum addition can facilitate quasi-crystalline phase formation, as discussed below.

Quasi-Crystal Precipitation Hardened High Mn Steels:

It is another object of the present disclosure to provide high Mn steels utilizing precipitation hardening of quasi-crystals. In exemplary embodiments, high Mn steels can be strengthened by the precipitation of quasi-crystals, and such structures can be achieved by heat treating at elevated temperatures (e.g., up to about 700° C.).

In general, quasi-crystalline materials have periodic atomic structures (e.g., 5-fold or 10-fold rotational symmetry), but usually do not conform to the 3-D symmetry typical of ordinary crystalline materials. Due to their crystallographic structure, quasi-crystalline materials with tailored chemistry exhibit unique properties, which are attractive for the strengthening of high Mn steels.

It is noted that the quasi-crystalline precipitates can provide higher strengthening effects than that of crystalline precipitates (e.g., carbides), because of the difficulty of dislocations to move through quasi-crystal lattices. Furthermore, quasi-crystals usually will not grow beyond certain sizes unlike crystalline precipitates, thereby alleviating over-aging concerns associated with certain crystalline precipitates.

Figure 6:
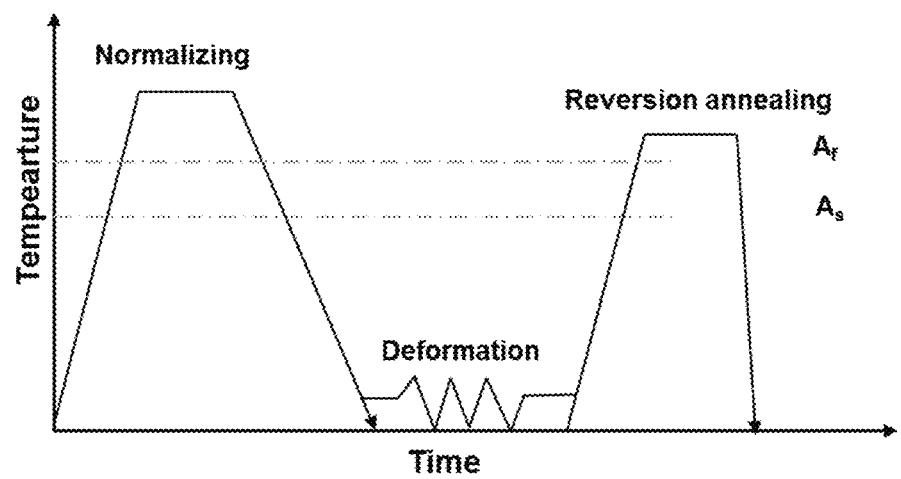
FIG. 6 depicts a schematic of an exemplary fabrication method for producing ultrafine grained high Mn steels according to the present disclosure.

Quasi-crystal materials typically provide non-stick surface properties due to their low surface energy (e.g., about 30 mJ/m$^2$) on stainless steel substrates in icosahedral Al—Cu—Fe chemistries. Due to their low surface energy, quasi-crystal materials exhibit a low friction coefficient (e.g., about 0.05) in scratch tests with diamond indentor in dry air, combined with relatively high micro-hardness. Quasi-crystalline materials are found in Al-TM (TM=transition metals; e.g., V, Cr, Mn), Al—(Mn, Cu, Fe)—(Si), and Al—Cu-TM (e.g., Cr, Fe, Mn, Mo) systems. Ultrafine grained High Mn Steels:

In exemplary embodiments, improved steel compositions (e.g., ultrafine grained high Mn steel compositions) can be fabricated by exemplary thermo-mechanical controlled processes (TMCP). In certain embodiments, especially in lower Mn alloying chemistry such as 8 wt. % or less in which ferrite or martensite phase is thermodynamically more stable than the austenite phase, the TMCP of the present disclosure includes heavy plastic deformation at ambient (e.g., 18-24° C.) and/or cryogenic (e.g., −196° C.) and/or intermediate temperatures to induce martensite formation, and subsequent annealing at elevated temperatures to reverse deformation-induced martensite into ultrafine grained austenite. An exemplary thermo-mechanical controlled process is schematically shown in FIG. 6. FIG. 6 depicts a schematic of an exemplary fabrication method for producing ultrafine grained high Mn steels according to the present disclosure. As shown in FIG. 6, $A_f$ is the austenite finish temperature (austenite recrystallization stop temperature), and $A_s$ is the austenite start temperature.

In exemplary embodiments and after heating and holding the steel composition at a normalizing temperature, the metastable austenite phase of the steel composition is transformed to a strain-induced martensite phase by heavy plastic deformation at ambient (e.g., 18-24° C.) and/or cryogenic (e.g., −196° C.) and/or intermediate temperatures (FIG. 6). The strain-induced martensite phase may be further heavily deformed to destroy lath or plate structures prior to a reversion treatment (e.g., reversion annealing in FIG. 6). The strain-induced martensite phase may be reverted to the austenite phase at temperatures low enough to suppress the grain coarsening of the reverted austenite phase. In exemplary embodiments, the chemistry of the steel compositions of the present disclosure (e.g., high Mn steel compositions) can be tailored so that the martensite start temperature ($M_s$) of reverted austenite is below room temperature (e.g., 18-24° C.).

Exemplary Methods for Fabrication:

The present disclosure provides for a method for fabricating a ferrous based component including: a) providing a composition having from about 5 to about 40 weight % manganese, preferably from about 9 to about 25 weight % manganese, even more preferably from about 12 to about 20 weight % manganese, and from about 0.01 to about 3.0 weight % carbon, preferably from about 0.5% to about 2.0 weight % carbon, even more preferably from about 0.7% to about 1.5 weight % carbon, and the balance iron, b) heating the composition to a temperature above the austenite recrystallization stop temperature of the composition (e.g., to a temperature to homogenize the composition); c) deforming the composition while the composition is at a temperature below the austenite recrystallization stop temperature of the composition; and d) quenching or accelerated cooling or air cooling the composition.

The present disclosure provides for a method for fabricating a ferrous based component wherein after step d), the matrix of the composition is predominantly or substantially in the austenitic phase. In one or more embodiments, the volume percent of austenite in the steel composition is from about 50 wt %/o to about 100 wt %, more preferably from about 80 wt % to about 99 wt %.

The steel composition is preferably processed into predominantly or substantially austenitic plates using a hot rolling process. In one or more embodiments, a steel billet/slab from the compositions described is first formed, such as, for example, through a continuous casting process. The billet/slab can then be re-heated to a temperature ("reheat temperature") within the range of about 1,000° C. to about 1,300° C., more preferably within the range of about 1050° C. to 1250° C., even more preferably within the range of about 1100° C. to 1200° C. Preferably, the reheat temperature is sufficient to: (i) substantially homogenize the steel slab/composition, (ii) dissolve substantially all the carbide and/or carbonitrides, when present, in the steel slab/composition, and (iii) establish fine initial austenite grains in the steel slab/composition.

The re-heated slab/composition can then be hot rolled in one or more passes. In exemplary embodiments, the reheated slabs/billets can be cooled to the rolling start temperature. In one or more embodiments, the rolling start temperature is above 900° C., preferably above 950° C., even more preferably above 1000° C.

In exemplary embodiments, the final rolling for plate thickness reduction can be completed at a "finish rolling temperature". In one or more embodiments, the finish rolling temperature is above about 700° C., preferably above about 800° C., more preferably above about 900° C. Thereafter, the hot rolled plate can be cooled (e.g., in air) to a first cooling temperature or accelerated cooling start temperature ("ACST"), at which an accelerated cooling starts to cool the plates at a rate of at least about 10° C. per second to a second cooling temperature or accelerated cooling finish temperature ("ACFT"). After the cooling to the ACFT, the steel plate/composition can be cooled to room temperature (e.g., ambient temperature) in ambient air. Preferably, the steel plate/composition is allowed to cool on its own to room temperature.

In one or more embodiments, the ACST is about 700° C. or more, about 750° C. or more, about 800° C. or more, or about 850° C. or more. In one or more embodiments, the ACST can range from about 700° C. to about 1000° C. In one or more embodiments, the ACST can range from about 750° C. to about 950° C. Preferably, the ACST ranges from a low of about 650° C., 700° C., or 750° C. to a high of about 900° C., 950° C., or 1000° C. In one or more embodiments, the ACST can be about 750° C., about 800° C., about 850° C., about 890° C., about 900° C., about 930° C., about 950° C., about 960° C., about 970° C., about 980° C., or about 990° C.

In one or more embodiments, the ACFT can range from about 0° C. to about 500° C. Preferably, the ACFT ranges from a low of about 0° C., 10° C., or 20° C. to a high of about 150° C., 200° C., or 300° C.

Without being bound by any theory, it is believed that the rapid cooling (e.g., more than about 10° C./sec cooling rate) to the low accelerated cooling finish temperature ("ACFT") retards at least a portion of the carbon and/or nitrogen atoms from diffusing from the austenite phase of the steel composition to the grain boundary or second phase. It is further believed that the high accelerated cooling start temperature ("ACST") retards at least a portion of the carbon and/or nitrogen atoms from forming precipitates such as, for example, carbides, carbonitrides, and/or nitrides during subsequent cooling to the ACFT. As such, the amount of precipitates at the grain boundaries is reduced. Therefore, the steel's fracture toughness and/or resistance to cracking is enhanced.

Following the rolling and cooling steps, the plate can be formed into pipes or the like (e.g., linepipe). Any suitable method for forming pipe can be used. Preferably, the precursor steel plate is fabricated into linepipe by a conventional UOE process or JCOE process which is known in the art.

The present disclosure will be further described with respect to the following examples; however, the scope of the disclosure is not limited thereby. The following examples illustrate improved systems and methods for fabricating or producing improved steel compositions (e.g., improved high Mn steel compositions having enhanced wear resistance or the like). As illustrated in the below examples, the present disclosure illustrates that the advantageous steel compositions/components of the present disclosure improve one or more of the following properties: wear resistance, ductility, crack resistance, erosion resistance, fatigue life, surface hardness, stress corrosion resistance, fatigue resistance, and/or environmental cracking resistance. In general, the strength/toughness and/or wear/erosion resistances of the steels of the present disclosure can be improved/increased through the control of microstructure and/or chemistry. As noted, some possible routes include promoting phase transformations (e.g., to martensite or epsilon phases), twinning during deformation, and/or introducing hard erosion resistant second phase particles to the compositions.

In exemplary embodiments, the present disclosure provides for a ferrous based component fabricated according to the steps comprising: a) providing a composition having from about 5 to about 40 weight % manganese, from about 0.01 to about 3.0 weight % carbon, and the balance iron; b) heating the composition to a temperature above the austenite recrystallization stop temperature of the composition; c) cooling the composition; d) deforming the composition while the composition is at a temperature below the austenite recrystallization stop temperature of the composition; and
e) quenching or accelerated cooling or air cooling the composition.

EXAMPLES

Example 1

In general, the erosion-corrosion behavior of a material (e.g., steel piping material) is a function of multiple inter-related parameters including slurry composition, erodent particle size/shape, and flow rate, as well as the chemistry/microstructure of the target materials. Impinging jet testing and gas impingement tests have been utilized to evaluate the erosion weight loss of selected steel materials under impact erosion conditions, thereby simulating hydro-transport pipeline environments.

Figure 7:
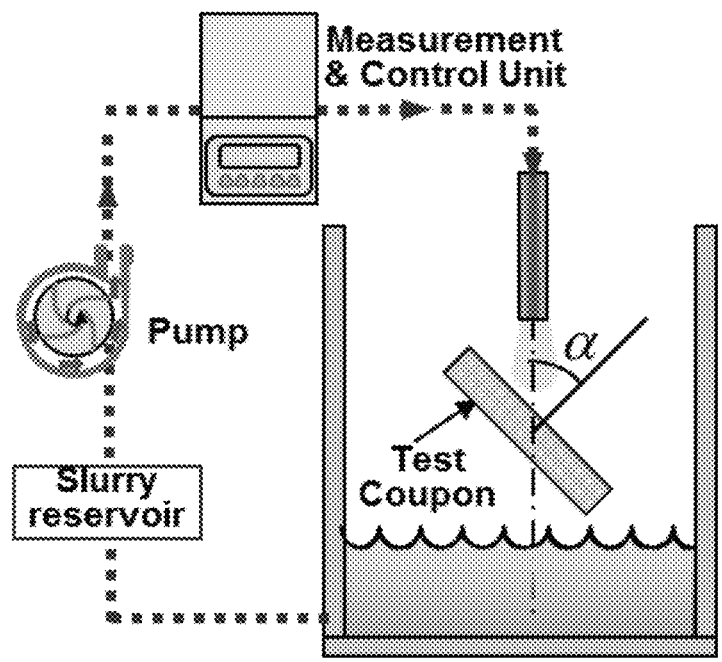
FIG. 7 shows a schematic of an exemplary impinging jet testing facility/configuration.

FIG. 7 shows a schematic of an exemplary impinging jet (e.g., jet impingement) testing facility/configuration. Erosion tests were carried out with a water and sand slurry containing about 25 weight % sand (AFS 50/70 standard silica sand). The water slurry also contained about 1500 ppm of NaCl, and the pH and temperature of the water was maintained at about 8.5 pH and about 45° C., respectively.

The target materials (e.g., steel compositions/components) were exposed to high speed (e.g., about 6 m/sec) water/sand slurry at three different impingement angles (α) (e.g., about 15°, about 45°, about 90°) for about four hours. The erosion weight loss and volume loss of the target materials were evaluated after each test using microbalance and laser profilometry, respectively.

Figure 8:
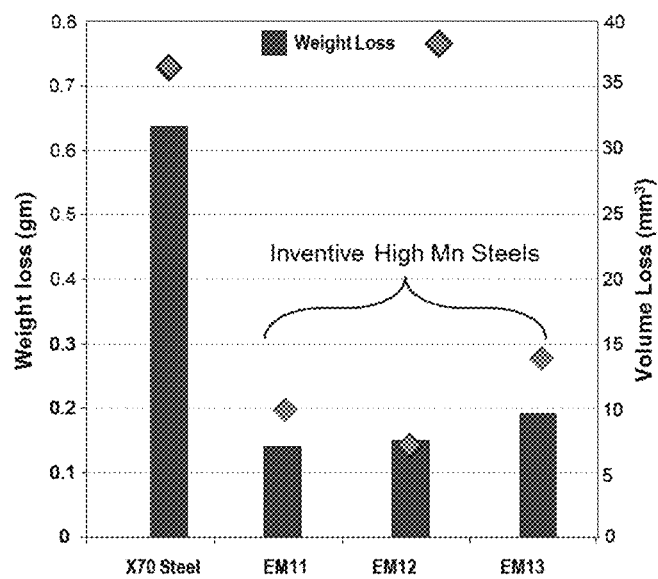
FIG. 8 is a graph showing the erosion weight loss and volume loss of three exemplary steels fabricated according to the present disclosure, and a comparative X70 carbon steel.

The erosion weight loss and volume loss of three exemplary steels (Steel 11 or EM11, Steel 12 or EM12, Steel 13 or EM13) fabricated according to the present disclosure, and a comparative X70 carbon steel are shown in FIG. 8. The nominal chemical compositions of the three (Steel 11 or EM11, Steel 12 or EM12, Steel 13 or EM13) exemplary high Mn steels are shown below in Table 1 (all compositions in weight %). FIG. 8 shows the weight loss and volume loss of the samples (X70 control sample, Steel 11 or EM11, Steel 12 or EM12, Steel 13 or EM13) after impingement jet testing at the about 45° impingement angle.

As shown in FIG. 8, the improved high Mn steels (Steel 11 or EM11, Steel 12 or EM12, Steel 13 or EM13) fabricated according to the systems/methods of the present disclosure showed up to four times the erosion resistance over the X70 carbon steel after the lab-scale jet impingement tests.

As such, the high strength and work hardening rate of the improved steels reduce the material loss during abrasion. It is noted that one drawback of enhancing material strength for wear/erosion resistance is that high strength can come with a compromise in ductility/fracture toughness. The metallurgical approaches of exemplary embodiments of the present disclosure enhance strength and ductility of the steel at the same time by refining the grain size.

After the erosion tests, the cross-sectional microstructure of the three high Mn steels (Steel 11 or EM11, Steel 12 or EM12, Steel 13 or EM13) and the comparative X70 steel were characterized using focused ion beam (FIB) combined with transmission electron microscopy (TEM). The three high Mn steels showed the formation of an ultrafine grained (about 10 nm grain size) surface layer after erosion testing, whereas the comparative X70 linepipe grade steel displayed the absence of a distinct ultrafine grained surface layer when it was subjected to identical erosion testing.

Figure 9A:
FIGS. 9A and 9B depict transmission electron microscopy bright field images of exemplary high Mn steel (FIG. 9A—sample XM12), and X70 carbon steel (FIG. 9B—comparative steel), showing the microstructure of a surface layer after erosion testing of high Mn steel (sample XM12), and no surface layer after erosion testing of the X70 carbon steel, wherein both samples were subjected to identical erosion testing conditions.
Figure 9B:
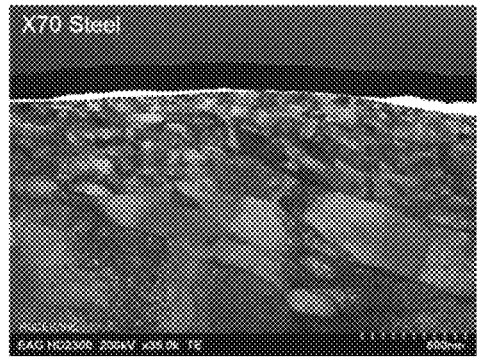

FIGS. 9A and 9B depict transmission electron microscopy bright field images of exemplary high Mn steel (FIG. 9A—sample Steel 12 or EM12), and X70 carbon steel (FIG. 9B—comparative steel), showing the microstructure of a surface layer after erosion testing of high Mn steel (sample Steel 12 or EM12), and no surface layer after erosion testing of the X70 carbon steel, wherein both samples were subjected to identical erosion testing conditions. The exemplary high Mn steel (FIG. 9A—Steel 12 or EM12) showed the formation of an ultrafine grained (e.g., about 10 nm grain size) surface layer after erosion testing, and the X70 steel (FIG. 9B) displayed the absence of a distinct ultrafine grained surface layer when it was subjected to identical erosion testing conditions.

Prior to erosion testing, the three high Mn steels (Steel 11 or EM11, Steel 12 or EM12, Steel 13 or EM13) were re-heated at about 1100-1120° C. and finished rolled at about 830° C. into about 12 mm thick plates, followed by accelerated cooling. The chemical composition of the three inventive steels are shown below in Table 1.

TABLE 1

Nominal chemical composition of high Mn steels (Compositions in weight %):

| Sample I.D. | Carbon (C) | Manganese (Mn) | Chromium (Cr) | Copper (Cu) | Silicon (Si) |
|---|---|---|---|---|---|
| Steel 11/EM11 | 1.2 | 18 | 3 | 0.5 | 0.1 |
| Steel 12/EM12 | 1.5 | 14 | 3 | 0.5 | 0.1 |
| Steel 13/EM13 | 0.8 | 14 | 3 | 0.5 | 0.1 |

Without being bound by any theory, it is noted that an increase in carbon content in the high Mn steel matrix enhances the mechanical strength of the steel and the work hardening rate. In exemplary embodiments, Mn alloying in the range of about 12-20 weight % of the total composition stabilizes the austenite phase, and increases the carbon solubility in the steel matrix. The Cr alloying up to about 3 weight % increases the corrosion resistance and the mechanical strength by solution strengthening. The Cu alloying of about 0.5 to about 2 weight % increases carbon solubility and corrosion resistance.

Example 2

Table 2 below shows the heat treatment conditions and microstructure of various embodiments of exemplary high Mn steel (Steel11/EM11). The nominal chemical compositions of the exemplary high Mn steel samples (Steel 11/EM11) utilized in Table 2 are shown above in Table 1.

TABLE 2

Various heat treatment/deformation conditions and resulting microstructure of exemplary high Mn steel compostions (Steel 11/EM11):

| Sample I.D. | Normalizing temp. (° C.) | Hot deformation temp. (° C.) | Cooling rate (° C./sec) | Grain size (μm) | Carbide fraction (Vol. %) |
|---|---|---|---|---|---|
| Steel 11 (EM11): As-rolled | Not Applicable | 830 | ~30 | 20-30 | >5 |
| Steel 11 (EM11): Solution heat treat | 1100 | Not Applicable | >60 | ~200 | <1 |

TABLE 2-continued

Various heat treatment/deformation conditions
and resulting microstructure of exemplary high
Mn steel compostions (Steel 11/EM11):

| Sample I.D. | Normalizing temp. (° C.) | Hot deformation temp. (° C.) | Cooling rate (° C./sec) | Grain size (µm) | Carbide fraction (Vol. %) |
|---|---|---|---|---|---|
| Steel 11A (EM11A) | 1050 | 1000 | ~30 | ~20 | <2 |
| Steel 11B (EM11B) | 1050 | 700 | ~30 | ~200 | <2 |
| Steel 11C (EM11C) | 1050 | 700 | ~2 | ~200 | <2 |

Figure 10:
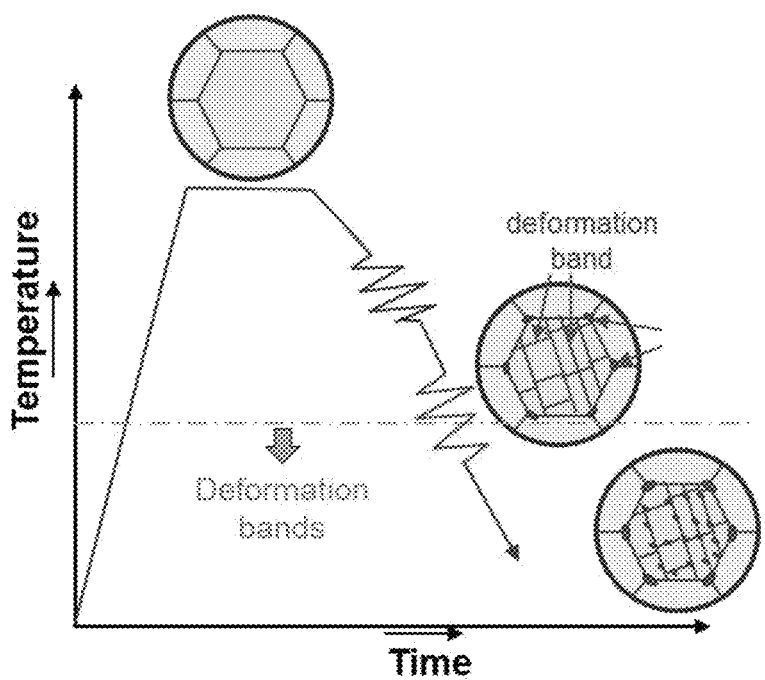
FIG. 10 shows exemplary thermo-mechanical controlled process (TMCP) hot rolling procedures/parameters for manufacturing improved steels having further enhanced erosion/wear resistance.

In exemplary embodiments and as shown in Table 2 and FIG. 10, the best erosion resistances were achieved in the steels with finer grain sizes (e.g., about 30 µm or less) and/or lower carbide precipitate fractions (e.g., less than about 2 volume %), as shown for samples Steel 11A (EM11A), Steel 11B (EM11B), and Steel 11C (EM11C).

FIG. 10 shows exemplary thermo-mechanical controlled process (TMCP) hot rolling procedures/parameters for manufacturing improved steels (e.g., high Mn steels) having further enhanced erosion/wear resistance. As such, FIG. 10 shows exemplary TMCP hot rolling procedures/parameters for fabricating steels having improved grain size and/or precipitates (e.g., carbide precipitate fraction vol. %) refinement. As shown in FIG. 10, $T_r$ is the austenite recrystallization stop temperature (austenite finish temperature).

In exemplary embodiments, the (TMCP) hot rolling parameters can be adjusted to obtain steel compositions having a refined grain sizes of about 200 µm or less, and/or low carbide precipitate fractions of about 5 volume % or less. The methods may include a finish rolling step or steps at lower temperatures, which would introduce deformation banding/dislocations tangles to thereby enhance the formation of fine intra-grain precipitates.

The exemplary modified TMCP hot rolling steps/parameters can be combined with the addition of various micro-alloying elements such as, without limitation, V, Nb, Ti, Mo and/or N. It has been found that the micro-alloying elements in high Mn steels can result in the formation of fine carbide/nitride/carbo-nitride precipitates finely dispersed in the steel matrix. The finely dispersed precipitates can retard grain coarsening during reheating and recrystallization during hot rolling, which thereby advantageously enhances the strength of the steel compositions/components of the present disclosure.

Figure 11:
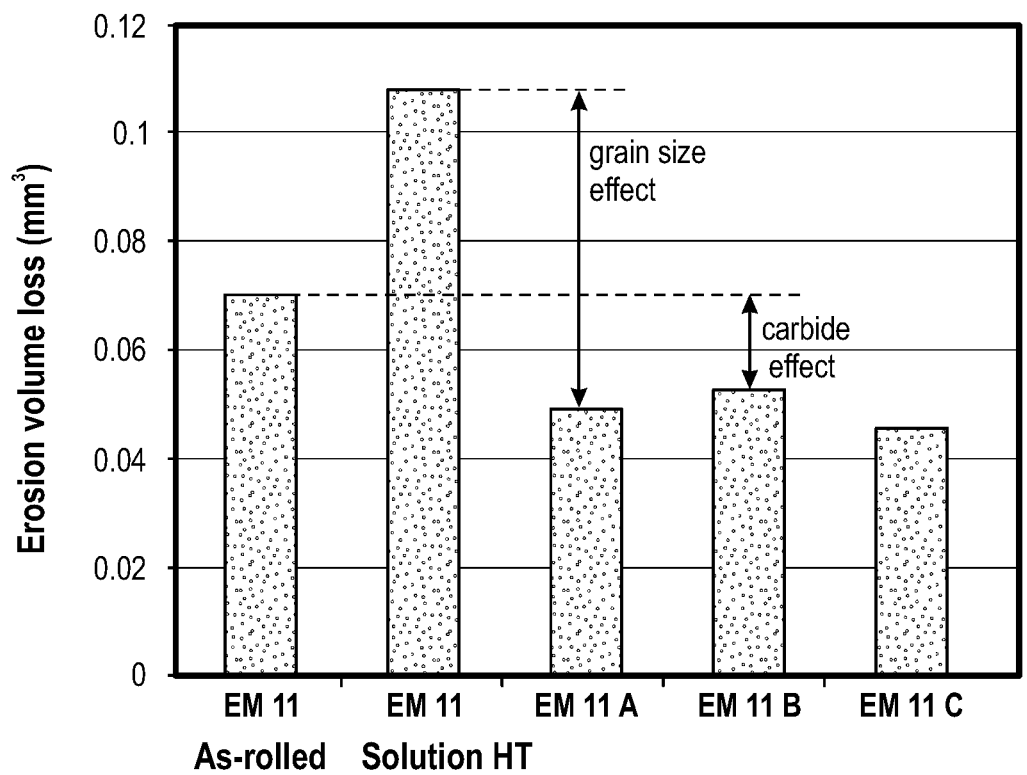
FIG. 11 is a graph that displays erosion volume loss in exemplary high Mn steel compositions/components after the steel compositions/components are fabricated in varied heat treatment conditions.

FIG. 11 is a graph that displays erosion volume loss in exemplary high Mn steel compositions/components after the steel compositions/components are fabricated in varied heat treatment/deformation conditions. More particularly, FIG. 11 shows erosion volume loss, evaluated by gas impingement testing, of exemplary high Mn steels to illustrate the effect of manufacturing processes on the microstructure and resulting erosion resistance of the exemplary steels. As noted, the best erosion resistances were achieved in the steels with finer grain sizes (e.g., about 30 µm or less) and/or lower carbide precipitate fractions (e.g., less than about 2 volume %), as shown for samples Steel 11A (EM11A), Steel 11B (EM11B), and Steel 11C (EM11C).

Example 3

Gas impingement erosion tests were carried out with an air and silicate glass beads slurry. The gas impingement tests were carried out at about 10 psi air pressure or 122 m/s gas flow rate with glass beads about 50 µm average diameter. The other parameters followed ASTM G76.

The target materials (e.g., steel compositions/components) were exposed to a high speed air/glass bead slurry at three different impingement angles (e.g., about 15°, about 45°, about 90°) for about 1 hour. The erosion weight loss and volume loss of the target materials were evaluated after each test using microbalance and laser profilometry, respectively.

The erosion weight loss and volume loss of three exemplary steels fabricated according to the present disclosure, and a comparative X65 carbon steel, are shown below in Table 3. The nominal chemical compositions of the exemplary high Mn steels are also shown in Table 3 (all compositions in weight %).

TABLE 3

Chemical composition and gas impingement erosion weight loss of high Mn steels (compositions in weight %):

| | C | Si | Mn | Al | Cr | Cu | Volume loss (mm3) | Note |
|---|---|---|---|---|---|---|---|---|
| X65 | 0.08 | 0.09 | 1.5 | 0.15 | 0.1 | 0.015 | 0.45 | Finish rolling temperature (FRT) >10000° C. |
| Steel C | 0.593 | 0.111 | 17.92 | 1.47 | — | — | 0.186 | |
| Steel D | 0.592 | 0.103 | 18.37 | 1.51 | 5.03 | — | 0.199 | |
| Steel E | 0.594 | 0.104 | 15.2 | 1.48 | — | — | 0.191 | |
| Steel 302 | 0.9 | 0.13 | 9.05 | — | 5.01 | — | 0.0893 | |
| Steel 305 | 0.9 | 0.13 | 11.8 | — | 5.01 | — | 0.117 | |
| Steel 303 | 1.2 | 0.1 | 8.9 | — | 5.0 | — | 0.067 | |
| Steel 306 | 1.2 | 0.1 | 12.1 | — | 4.9 | — | 0.045 | |
| Steel F | 1.2 | 0.5 | 18.0 | — | 2.1 | — | 0.067 | |
| Steel 11 | 1.2 | 0.1 | 18.0 | — | 3.0 | 0.5 | 0.071 | 830° C. FRT |
| Steel 202 | 1.2 | 0.1 | 18.0 | — | 3.0 | 0.5 | 0.103 | 930° C. FRT |
| Steel 204 | 1.2 | 0.1 | 18.0 | — | 3.0 | 2.0 | 0.053 | 930° C. FRT |
| Steel 206 | 1.5 | 0.1 | 18.0 | — | 3.0 | 0.5 | 0.128 | 930° C. FRT |
| Steel 208 | 1.5 | 0.1 | 18.0 | — | 3.0 | 2.0 | 0.065 | 930° C. FRT |

As shown in Table 3, the high Mn steels fabricated according to the systems/methods of the present disclosure showed up to ten times the erosion resistance over the X65 carbon steel.

Example 4

Table 4 below shows the chemical composition and gas impingement erosion weight loss of micro-alloyed high Mn steels. All the micro-alloyed high Mn steels (e.g., Steel 601, Steel 602, Steel 603, Steel 604, Steel 605) were fabricated by reheating at about 1120° C., finish rolling at about 970° C., followed by accelerated cooling to room temperature.

TABLE 4

Chemical composition and gas impingement erosion weight loss of micro-alloyed high Mn steels (compositions in weight %):

|  | C | Si | Mn | Cr | Cu | Mo | Ti | Nb | V | N | Volume loss (mm3) |
|---|---|---|---|---|---|---|---|---|---|---|---|
| X65 | 0.08 | 0.09 | 1.5 | 0.1 | 0.015 |  | 0.008 | 0.008 |  | 0.004 | 0.45 |
| Steel 601 | 1.22 | 0.071 | 17.76 | 3.04 | 0.5 | — | — | 0.022 | — | — | 0.0595 |
| Steel 602 | 1.24 | 0.167 | 18.3 | 3 | 0.5 | — | 0.019 | 0.023 | — | 0.083 | 0.0445 |
| Steel 603 | 1.21 | 0.114 | 18.08 | 3 | 0.5 | — | — | 0.022 | 0.095 | — | 0.0536 |
| Steel 604 | 1.19 | 0.119 | 18.02 | 2.96 | 0.5 | 1.01 | — | 0.02 | — | — | 0.0587 |
| Steel 605 | 1.17 | 0.109 | 12.18 | 2.92 | 0.5 | — | — | 0.02 | — | — | 0.0612 |

As shown in Table 4, the micro-alloyed high Mn steels fabricated according to the systems/methods of the present disclosure showed up to ten times the erosion resistance over the X65 carbon steel.

Whereas the disclosure has been described principally in connection with steel compositions for use in components for material conveying systems, fluids/solids transport systems, mining operations, oil sand piping systems, earth-moving equipment, drilling components, and/or oil/gas/petrochemical applications, such descriptions have been utilized only for purposes of disclosure and are not intended as limiting the disclosure. To the contrary, it is to be recognized that the disclosed steel compositions are capable of use in a wide variety of applications, systems, operations and/or industries.

Although the systems and methods of the present the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A method for fabricating a ferrous based component, the method comprising:
   (a) providing a composition having:
      from about 5 to about 40 weight % manganese,
      from about 0.01 to about 3.0 weight % carbon,
      from about 3 to about 30 weight % chromium,
      from about 0.001 to about 3 weight % nitrogen,
      from 0 to about 15 weight % aluminum,
      from 0 to about 10 weight % silicon,
      from 0 to about 10 weight % copper,
      from 0 to about 10 weight % niobium,
      from 0 to about 10 weight % vanadium,
      from 0 to about 10 weight % titanium,
      from 0 to about 20 weight % nickel,
      from 0 to about 1 weight % boron,
      from 0 to about 20 weight % cobalt,
      from 0 to about 10 weight % molybdenum,
      from 0 to about 10 weight % tungsten,
      from 0 to about 10 weight % tantalum,
      from 0 to about 6 weight % zirconium,
      from 0 to about 6 weight % hafnium,
      from 0 to about 6 weight % lanthanum,
      from 0 to about 6 weight % scandium,
      from 0 to about 6 weight % cerium, and
      the balance iron;
   (b) heating the composition to at least about 1000° C.;
   (c) cooling the composition at a rate of from about 2° C. per second to about 60° C. per second, followed by hot rolling the composition at a temperature in a range of about 700° C. to about 1000° C.;
   (d) slowly cooling or isothermally holding the composition; and
   (e) quenching or accelerated cooling or air cooling the composition from a temperature in a range of from 700° C. to about 1000° C. to a temperature in a range of from 0° C. to about 500° C. at a rate of at least about 10° C. per second.

2. The method of claim 1, wherein step (b) includes heating the composition to at least about 1100° C.

3. The method of claim 1, wherein after step (e), the carbide precipitate fraction volume of the composition is about 5 volume % or less of the composition.

4. The method of claim 1, the composition has a microstructure having a refined grain size of about 100 μm or less.

5. The method of claim 4, wherein the microstructure having a refined grain size of about 100 μm or less includes a surface layer of the composition.

6. The method of claim 5, wherein the thickness of the surface layer is from about nm to about 5000 nm.

7. The method of claim 1, wherein a surface layer is formed prior to or during use of the composition, wherein the surface layer comprises a microstructure having a refined grain size of about 100 μm or less.

8. The method of claim 5, wherein the surface layer is comprised of predominantly the austenite phase.

9. The method of claim 5, wherein the surface layer is formed via a surface deformation technique selected from the group consisting of shot peening, laser shock peening, surface burnishing and combinations thereof.

10. The method of claim 1, further comprising after step (e) a surface deformation step selected from the group consisting of shot peening, laser shock peening, surface burnishing and combinations thereof.

11. The method of claim 1, further comprising, after step (e), heating the composition to a temperature above the austenite recrystallization stop temperature, and then quenching the composition.

12. The method of claim 1, wherein at least one of: the chromium ranges from 3 to about 20 weight % of the total composition; the nickel ranges from 0.5 to 20 weight % of the total composition; the cobalt ranges from 0.5 to 20 weight % of the total composition; the aluminum ranges from 0.2 to 15 weight % of the total composition; the molybdenum ranges from 0.2 to 10 weight % of the total composition; the niobium ranges from 0.2 to 10 weight % of the total composition; the copper ranges from 0.2 to 10 weight % of the total composition; the titanium ranges from 0.2 to 10 weight % of the total composition; the vanadium ranges from 0.2 to 10 weight % of the total composition; the silicon ranges from 0.01 to 10 weight % of the total composition; the nitrogen ranges from 0.01 to 3.0 weight % of the total composition; the boron ranges from 0.001 to 0.1 weight % of the total composition; the zirconium ranges from 0.2 to 6 weight % of the total composition; the hafnium ranges from 0.2 to 6 weight % of the total composition; or a combination thereof.

13. The method of claim 1, wherein the composition includes from about 8 to about 40 weight % manganese, from about 0.60 to about 3.0 weight % carbon, from 3 to about 5 weight % chromium, from about 0.5 to about 2.0 weight % copper, from about 0.1 to about 1 weight % silicon, and the balance iron.

14. The method of claim 1, wherein step (c) causes transformation induced plasticity or twin-induced plasticity.

* * * * *